(12) United States Patent
Craig (10) Patent No.: US 9,737,055 B2
(45) Date of Patent: Aug. 22, 2017

(54) STORAGE POUCH WITH CHANNEL FOR INTERCHANGEABLY COUPLING TO A LEASH ON A PET OR OTHER ANIMAL EQUIPMENT

(71) Applicant: Cathryn D. Craig, Valencia, CA (US)

(72) Inventor: Cathryn D. Craig, Valencia, CA (US)

(*) Notice: Subject to any disclaimer, the term of this patent is extended or adjusted under 35 U.S.C. 154(b) by 140 days.

(21) Appl. No.: 14/659,181

(22) Filed: Mar. 16, 2015

(65) Prior Publication Data
US 2015/0257370 A1    Sep. 17, 2015

Related U.S. Application Data

(60) Provisional application No. 61/954,476, filed on Mar. 17, 2014.

(51) Int. Cl.
*A01K 27/00*    (2006.01)

(52) U.S. Cl.
CPC .................. *A01K 27/008* (2013.01)

(58) Field of Classification Search
CPC .................................... A01K 27/008
USPC ..... 211/86.01; 119/770, 792, 793, 794, 795, 119/796, 797, 798
See application file for complete search history.

(56) References Cited

U.S. PATENT DOCUMENTS

| | | | | |
|---|---|---|---|---|
| 1,388,073 A * | 8/1921 | Stewart | A24F 15/18 | 206/259 |
| 1,631,371 A * | 6/1927 | Greubel | A45C 11/22 | 206/259 |
| 1,648,565 A * | 11/1927 | Primley | A63B 47/00 | 150/112 |
| 1,670,945 A * | 5/1928 | Ward | A41F 9/002 | 206/101 |
| 1,818,793 A * | 8/1931 | Coryell | A45D 33/26 | 132/297 |
| 2,285,836 A * | 6/1942 | Rettenmeyer | A24F 27/12 | 206/103 |
| 2,413,580 A * | 12/1946 | Perry | F42B 39/02 | 206/3 |
| 2,479,472 A * | 8/1949 | Coplon | A45C 11/04 | 150/145 |

(Continued)

*Primary Examiner* — Michael Safavi
(74) *Attorney, Agent, or Firm* — Lazaris IP (57) ABSTRACT

A storage pouch is adapted to couple to a pet's leash and securely hold items while walking a pet, such as mobile devices, phones, portable music players, identification, and personal items. The storage pouch is configured with a channel so that a pet's leash or other equipment is capable of passing or threading through an opening formed of mesh, cloth or fabric or other such material within the storage pouch, thereby securing the storage pouch in place to the leash. The channel may be formed between pockets on either side of the storage pouch, or on an outer surface on one side of the storage pouch, regardless of whether the pouch has a single-sided pocket or double-sided pocket configuration. Additionally, the storage pouch accommodates corded headset ear bud devices, maintaining the proper length of the cord between the instrument and the ears. The storage pouch provides a hands-free method of carrying and talking on a mobile phone, and a method of storing small personal items away from one's person, and enables receiving and making phone calls and listening to music while the phone or portable music player remains secure within the pouch.

5 Claims, 10 Drawing Sheets

(56) References Cited

U.S. PATENT DOCUMENTS

| | | | | | |
|---|---|---|---|---|---|
| 3,323,638 | A | * | 6/1967 | Dishart | A45C 11/04 132/148 |
| 4,047,650 | A | * | 9/1977 | Domingos | A45F 5/02 224/223 |
| 4,166,489 | A | * | 9/1979 | Lemelson | A44B 15/005 206/38.1 |
| 4,739,877 | A | * | 4/1988 | Olson | A44B 15/005 150/900 |
| 4,741,372 | A | * | 5/1988 | Santilli | A45C 11/182 150/137 |
| 5,325,959 | A | * | 7/1994 | Goldberger | B42D 9/004 116/239 |
| 5,718,192 | A | * | 2/1998 | Sebastian | A01K 27/006 119/795 |
| 6,019,067 | A | * | 2/2000 | Carey | A01K 27/006 119/795 |
| 6,085,695 | A | * | 7/2000 | Miller | A01K 27/006 119/795 |
| 6,257,473 | B1 | * | 7/2001 | Ringelstetter | E01H 1/1206 119/795 |
| 6,619,349 | B2 | * | 9/2003 | Gribovsky | A45C 1/06 150/135 |
| 7,270,255 | B2 | * | 9/2007 | Badillo | A45C 9/00 224/191 |
| D602,689 | S | * | 10/2009 | Hewitt | D3/247 |
| D651,396 | S | * | 1/2012 | Raines | D3/226 |
| 8,919,629 | B2 | * | 12/2014 | Moreau | A45F 5/004 2/66 |
| D733,978 | S | * | 7/2015 | Bayless | D3/226 |
| 2009/0173761 | A1 | * | 7/2009 | Berry | A01K 27/006 224/250 |
| 2009/0205585 | A1 | * | 8/2009 | La Herran | A01K 27/006 119/795 |
| 2010/0269763 | A1 | * | 10/2010 | Kraft | A01K 27/006 119/795 |
| 2011/0011504 | A1 | * | 1/2011 | Steinbacher | A01K 27/006 150/106 |
| 2012/0167834 | A1 | * | 7/2012 | Cummings | A01K 27/008 119/796 |
| 2015/0053145 | A1 | * | 2/2015 | Miksovsky | A01K 27/003 119/772 |

* cited by examiner

STORAGE POUCH WITH CHANNEL FOR INTERCHANGEABLY COUPLING TO A LEASH ON A PET OR OTHER ANIMAL EQUIPMENT

CROSS-REFERENCE TO RELATED PATENT APPLICATIONS

This patent application claims priority to U.S. provisional application 61/954,476, filed on Mar. 17, 2014, the contents of which are incorporated in their entirety herein.

FIELD OF THE INVENTION

The present invention relates to pet accessories. Specifically, the present invention relates to a pouch adapted to couple with a pet's leash for storing items while exercising or walking a pet. The pouch is configured to stay secure at the top of a leash near a handle, and is interchangeable with most leashes.

BACKGROUND OF THE INVENTION

There are many types of apparatuses, devices and products available that enable pet owners to walk or exercise their pets without the pet running away uncontrolled, commonly known as leashes. There are also many types of storage devices available for people to place personal items such as mobile phones or music players while walking or exercising their pets, such as for example packs secured with a zipper or hook-and-loop system and worn around the hips or waist with strap. However, there is no existing apparatus designed to securely hold personal items on a leash and away from one's person, so that users can walk or run with their pets while still being able to conduct a hands-free phone conversation or listen to music. Similarly, there is no existing apparatus designed simply to securely store items away from their person and on a leash while walking exercising a pet.

Many people enjoy engaging in athletic activities with their pets, such as running. While running, pockets or purses are often cumbersome items to use to store items such phones, music players, identification documents, or other personal items. There is therefore a need in the art for an apparatus and device that enables such items to be stored on a pet's leash while a pet is being walked or while the owner of the pet is running with the pet attached to the leash.

Some pet leashes include a pocket, usually made from mesh or other stretchable material, configured as part of a handle so that it is part of the leash itself. Such configurations have durability problems as they are at risk of easy tearing or losing shape due to the proximity to the handle. When the pocket tears or breaks in some way, or loses its intended function, a new leash must be purchased.

BRIEF SUMMARY OF THE INVENTION

It is one objective of the present invention to provide for convenient storage of items on a pet's leash. It is another objective of the present invention to provide a storage pouch for use with a pet's leash. It is another objective of the present invention to provide for hands-free use of equipment, and for securely storing items such as identification documents, while exercising a pet, such as walking, running or playing. It is still another objective of the present invention to provide a secure place to store personal items while exercising a pet so that handbags, packs, purses and clothing do not need to be used. It is still another objective of the present invention to provide an interchangeable apparatus for use on many different types of pet leashes or animal equipment, having a channel through which a leash or other component of animal equipment feeds through to couple thereto.

The present invention is an interchangeable storage pouch for use when exercising a pet. The storage pouch includes one or more pockets and a channel through which a leash or other component of equipment for use on animals is capable of being fed through to removeably and interchangeably couple the storage pouch thereto. In one embodiment, the storage pouch comprises a pair of pockets formed within each of a front side and a back side of the storage pouch. Each pocket includes a flap and a fastening means for closing the pocket and securely holding one or more items within the pocket while a pet is being exercised. The channel is positioned between the pair of pockets for accepting a leash of a pet so that the leash feeds into and passes through the channel and the storage pouch, and a fastening device for coupling the storage pouch to a handle of the leash.

In another embodiment, the present invention is a storage pouch for use when exercising a pet that comprises a pocket positioned on an outer surface of a front side of a storage pouch. The pocket has two compartments formed therein, and a flap configured with fastening means for closing the pocket and securely holding one or more items within each of the two compartments while a pet is being exercised. The channel is positioned on an outer surface of a back side, for accepting a leash of a pet so that the leash feeds into and passes through the channel, to enable the storage pouch to be affixed to the leash while the pet is being exercised. The storage pouch also includes a fastening device for coupling the storage pouch to a handle of the leash.

Other objects, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

Figure 1:
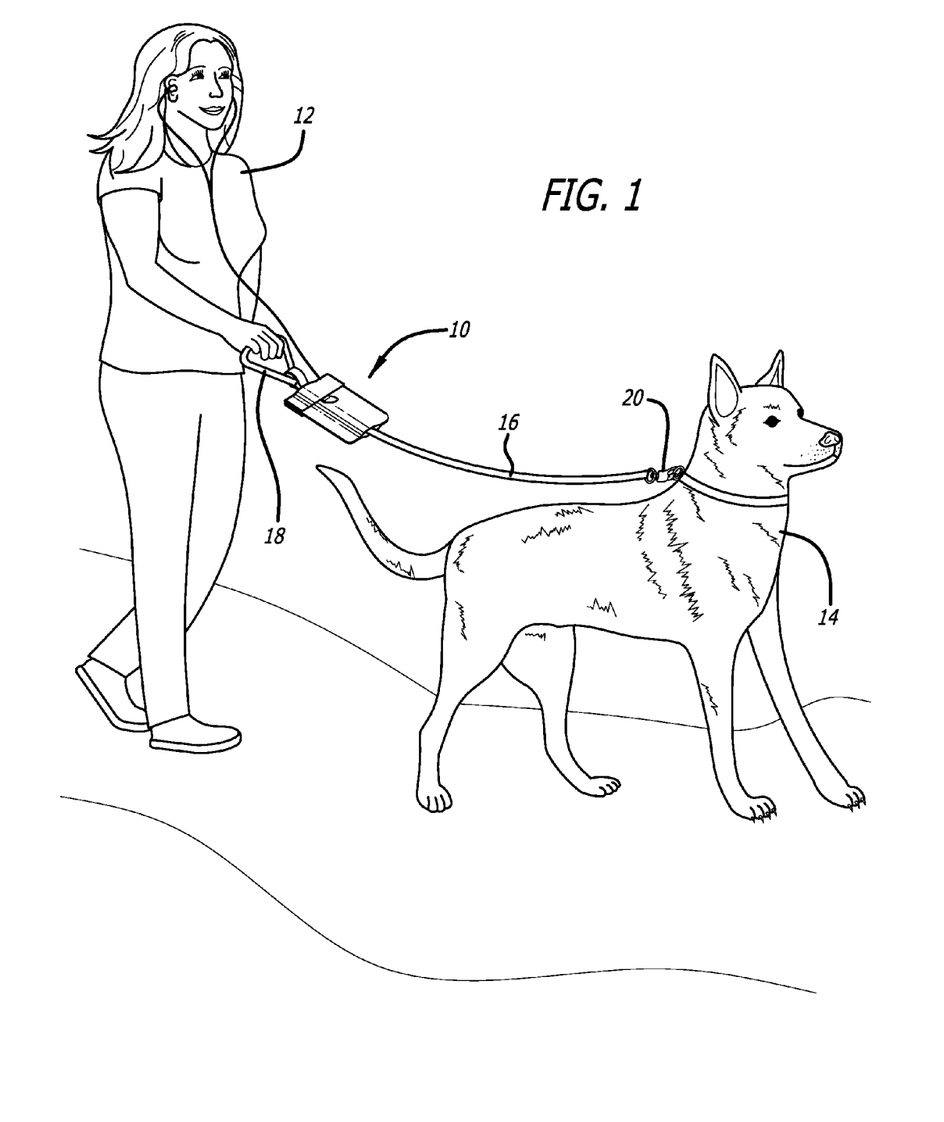
FIG. 1 is an overall view of a storage pouch according to one embodiment of the present invention while in use by a person exercising a pet.

The present invention is a storage pouch for use when exercising a pet that is removable from, and interchangeable with, pet leashes and other animal exercising or riding equipment. The inventive storage pouch includes one or more pockets and a channel configured thereon, providing an opening through which the leash or other component of equipment for use on animals is capable of being fed into and passing through to couple the storage pouch so that items may be securely held away from one's person while exercising a pet. FIG. 1 is an overall depiction of a storage pouch 10 according to one embodiment of the present invention. In FIG. 1, a user 12 is shown exercising a pet 14 using a leash 16. The leash 16 includes a handle 18 and a connection portion 20 for coupling the leash 16 to a collar or other such apparatus on the pet 14. The storage pouch 10 is configured to carry within it one or more items such as a mobile telephone or other such device, and FIG. 1 additionally depicts the user 12 with a corded headset coupled to an item within the storage pouch 10 while the user 12 listens to audio via headset ear bud device.

The storage pouch 10, and the components thereof, may be made of any suitable material, such as mesh, leather, or natural or synthetic cloths and fabric. The channel 22 provides an opening for a means of attachment to the leash 16. The storage pouch 10 may be comprised of one or more pockets. In the embodiment as in FIG. 1, the leash 16 slides through the channel 22 between front and back pockets of a double-sided storage pouch 10. Other configurations in additional embodiments are described further herein.

Natural or synthetic cloths and fabric used to make the storage pouch 10 and the components included therein, may include materials such as cotton, wool, linen, silk, and woven cloths and fabrics from either animal or vegetable fibers, such as for example, but not limited to, burlap. Other suitable materials may also include neoprene, or any similar polychloroprene composition or synthetic rubber that are produced by polymerization of chloroprene; KEVLAR®, or similar para-aramid synthetic fiber; polyester; nylon; canvas; and blended fabrics such as polyester blends and nylon blends. Accordingly it is to be understood that many different types of materials and fabrics may be used and are within the scope of the present invention, and therefore the present invention, regardless of the embodiment in this description, is not to be limited to any one type of material or fabric, nor any one type of material or fabric described herein.

Figure 2A:
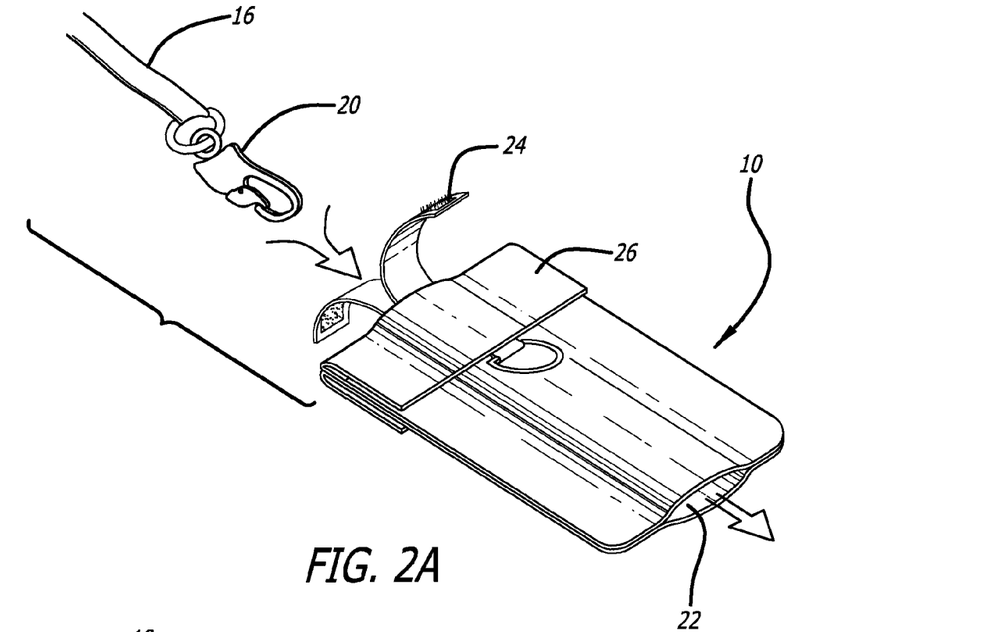
FIG. 2A is a close-up perspective view of a storage pouch according to one embodiment of the present invention.
Figure 2B:
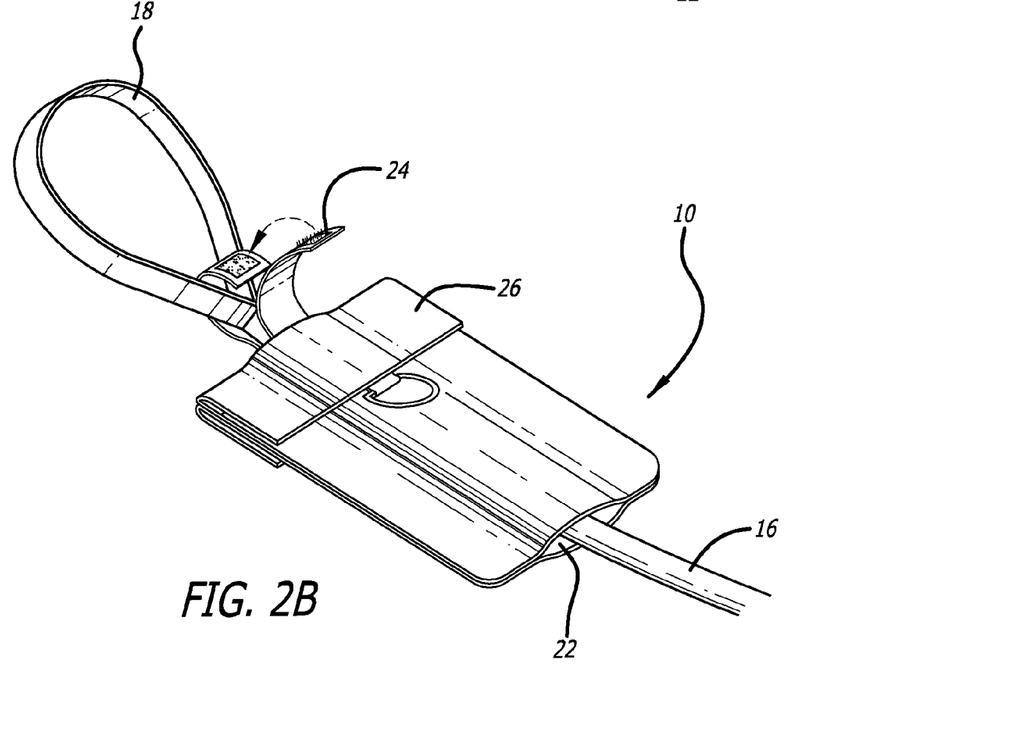
FIG. 2B is another close-up perspective view of a storage pouch according to one embodiment of the present invention.

It is to be understood, as noted above, that many different design configurations and embodiments of the storage pouch are possible, as further described herein. FIGS. 2A and 2B depict one such design configuration, in which the storage pouch 10 has a double-sided arrangement with a single pocket on each side of the storage pouch 10. The leash 16 feeds through a center channel 22 via at least one opening between front and back pockets of the storage pouch 10 and secures to the pet's existing leash 16 at or near the handle 18 with a fastening mechanism 24 such as a hook-and-loop system (such as for example VELCRO®), snaps, buttons, carabiners, or any other device or means for securing the storage pouch 10 to the leash 16. The leash 16 therefore is capable of passing through the channel 22 via the at least one opening so that one end of the leash 16 is held by the user 12 with the handle 18, and the other end of the leash 16 couples to the collar of the pet 14 using the connection portion 20. The storage pouch 10 is therefore positioned at some point along the leash 16 when in use, such as near the handle 18.

Each pocket of the storage pouch 10 may be secured using a tab or flap 26 sewn into and near the top of the pouch that forms a closeable opening. The opening may be closed using a hook-and-loop fastening system (such as for example VELCRO®), one or more snaps, buttons, carabiners, or any other fastener to hold contents within each pocket of the storage pouch 10 securely. A ring may also be affixed to the flap 26 or to the outside of the pocket of the storage pouch 10 for coupling items such as keys or a set of keys. The ring may also be used to affix a bell or other noise-making device to provide notice to others nearby that a person is exercising a pet.

Figure 3:
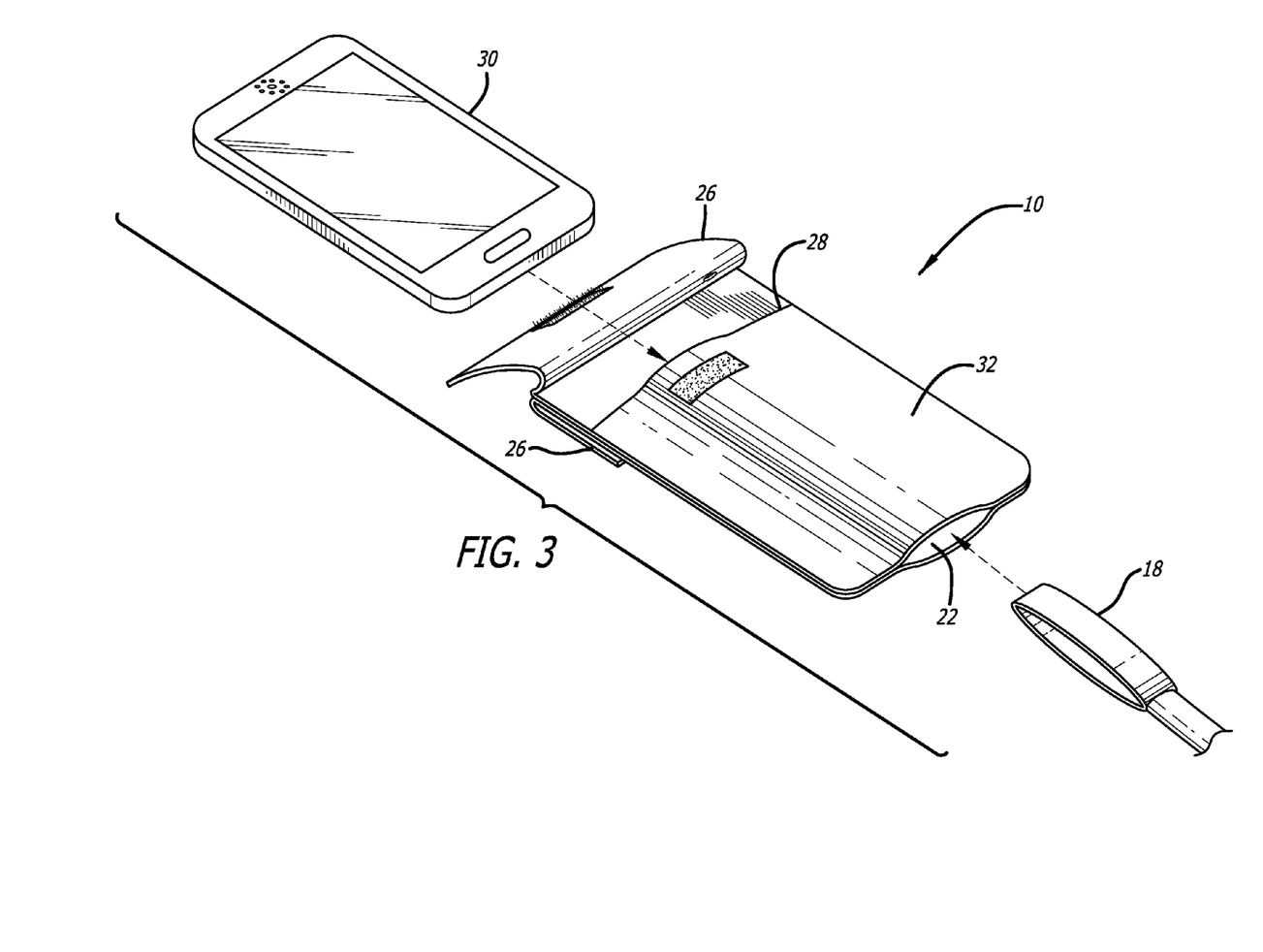
FIG. 3 is a yet another close-up perspective view of a storage pouch according to one embodiment of the present invention, in which a mobile device is being inserted therein.

FIG. 3 is a view of the storage pouch 10 ready to receive an item to be secured and/or stored in a pocket 28, and a handle 18 of a leash 16 ready to be threaded through the opening in the channel 22 between the pockets 28. The item to be stored is shown in FIG. 3 is a mobile device 30, although as noted here any item may be so stored in the pocket(s) 28 of the storage pouch 10. The pocket(s) 28 include an opening that is closed at least in part by the flaps 26.

Figures 4, 5, 6:
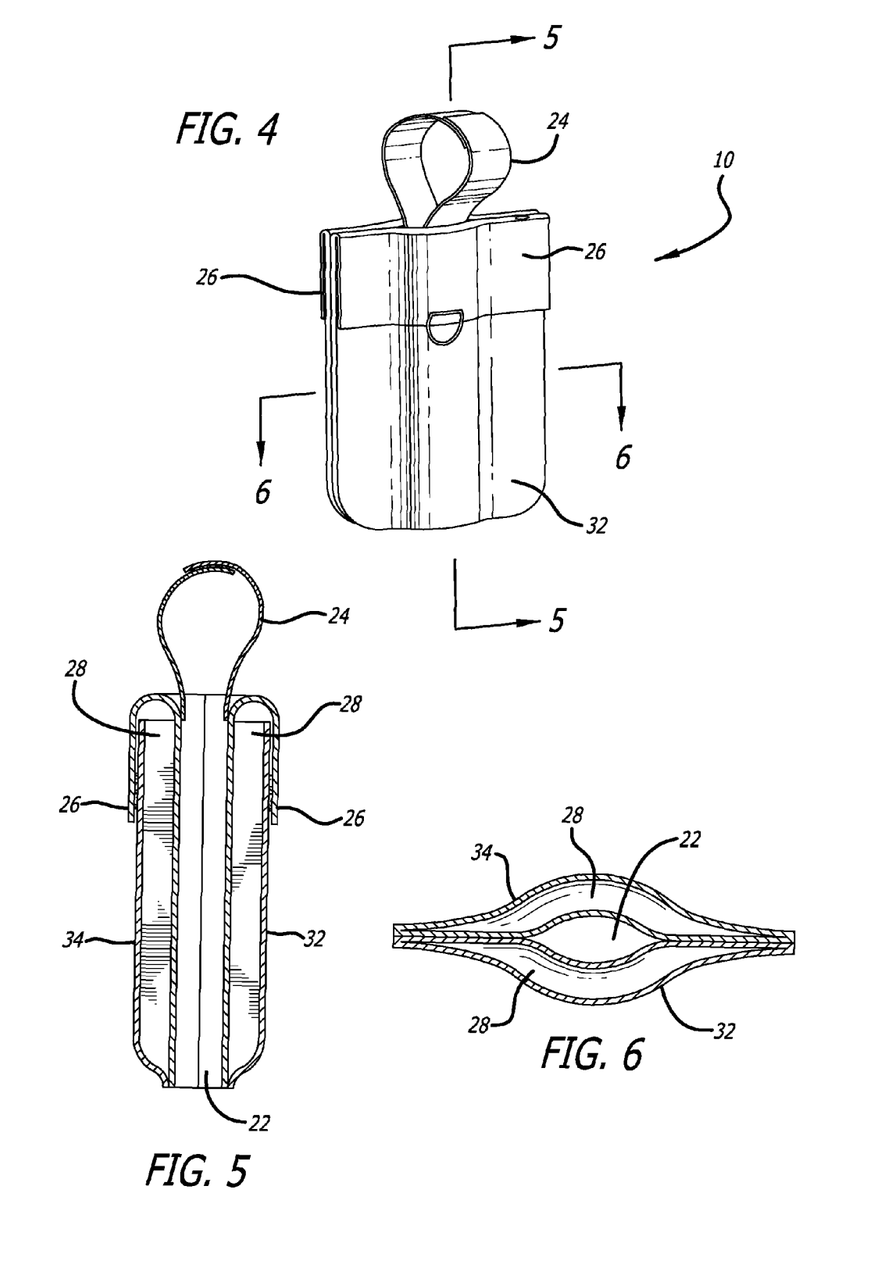
FIG. 4 is a front view of a storage pouch according to one embodiment of the present invention.
FIG. 5 is a cross-section along line 5-5 of FIG. 4 of a storage pouch according to one embodiment of the present invention.
FIG. 6 is a cross-section along line 6-6 of FIG. 4 of a storage pouch according to one embodiment of the present invention.

FIG. 4 is a front view of the storage pouch 10 in an upright position. The storage pouch 10 is shown with both front and back pockets 28 in a closed and fastened position using flaps 26. An item, such as mobile device 30, is positioned within the pocket 28 on the front side 32 of the storage pouch 10. FIG. 5 is a cross-sectional view along line 5-5 of the upright position shown in FIG. 4, clearly showing the two pockets 28 on each of the front side 32 and back side 34 of the storage pouch 10, and the channel 22 which is the opening between the pockets 28 through which the leash 16 is threaded. The leash 16 slides through this channel 22 and allows the attachment of the storage pouch 10 to the collar on the pet 14 using the connection portion 20. The channel 22 keeps the leash 16 in a secure position and prevents it from shifting or moving when the user 12 is exercising a pet 14. FIG. 6 is a cross-sectional view along line 6-6 of the upright position of FIG. 4.

It is contemplated that the overall dimensions of the storage pouch 10 may be approximately 4"×6.5". However, the storage pouch 10 may be produced in any configuration and may have different dimensions, depending at least in part on items 30 to be stored within the pockets 28. Additionally, it is contemplated that an empty storage pouch 10 can expand, and may be formed of materials which enable the thickness of the storage pouch 10 (and walls of pockets 28) to expand accordingly, to accommodate items of different sizes, such as mobile phones, tablet computers, and many different kinds of personal items.

It is to be understood that in one embodiment of the present invention, the fastening mechanism 24 securely couples the storage pouch 10 to the leash 16 so that the storage pouch 10 remains positioned in substantially the same plane as the leash 16 relative to the pet. The fastening mechanism 24 therefore enables a configuration that prevents the storage pouch 10 from swinging relative to the leash 16 when in use while exercising a pet. This protects devices and items placed within the storage pouch 10 from damage or loss from excessive movement and/or falling out of the storage pouch 10.

Figure 7:
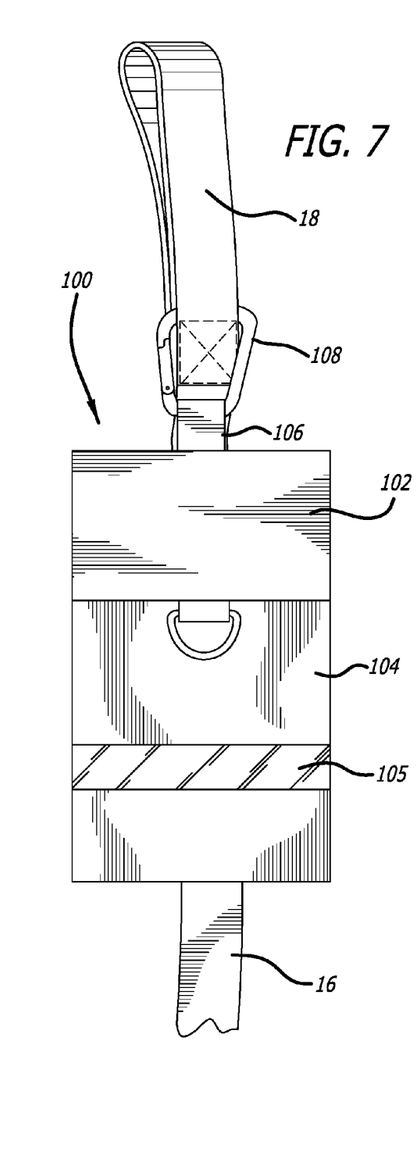
FIG. 7 is a front-side view of a storage pouch according to another embodiment of the present invention.

In another embodiment of the present invention, one or more pockets of a storage pouch 100 are arranged in a single-sided configuration, and therefore comprised of a single pocket on a front side 104. A channel 118 is arranged on a back side of the storage pouch 100, to provide an opening through which to pass a leash 16 to attach to the collar of a pet 14. FIG. 7 shows a front view of this embodiment, in which the storage pouch 100 has a leash 16 fed through a channel 118 formed of a fabric, cloth, mesh, leather, or any other material (as described above) on the back side of, and attached to, the storage pouch 100. The leash handle 18 is attached to the storage pouch 100 with a carabiner 108 or other attachment means. A flap 102 on the storage pocket is closed, and a tab is included on the flap 102 for attaching a "D" (or any other shape) ring device to the flap 102 for hooking other items such as keys and securing them to the storage pouch 100. A reflective safety strip 105 may also be included on an outer surface of the storage pouch 100 on this any other embodiment presented herein to support safer pet exercising at night and enable motorists to visually recognize both a walker and a pet.

In this embodiment of the present invention, a tab 106 may be sewn or otherwise affixed to the top of the storage pouch 100 to enable the storage pouch 100 to be attached to the user's existing leash handle 18. This device may also include a grommet for further fastening the tab 106 to the storage pouch 100. A carabiner 108 or other attachment device may be further included to attach the storage pouch 100 to the user's existing leash handle 18 with the tab 106.

Figure 8:
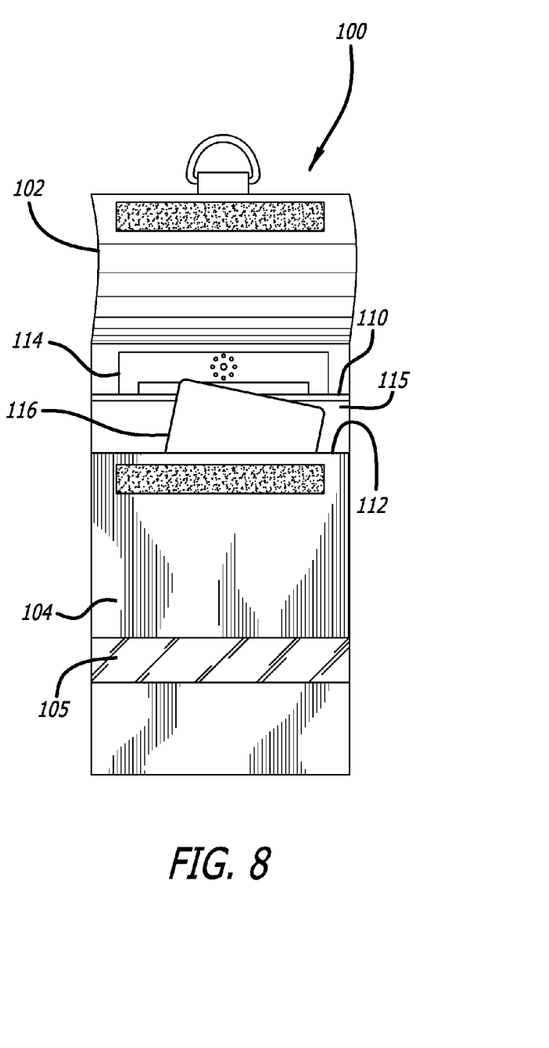
FIG. 8 is another front-side view of a storage pouch according to the embodiment of FIG. 7, showing a flap open and revealing multiple compartments therein.

FIG. 8 is a front view of this embodiment of the present invention, showing the storage pouch 100 with the flap 102 in an open position to reveal multiple compartments for holding various items, such as mobile phones or devices, portable music players, tablet computers, and other personal items. A hook-and-loop fastening system such as VELCRO® is shown in FIG. 8, but as noted above, any type of fastening mechanism may be used to close the flap 102. The flap 102 includes a ring attached by a tab for hooking on other items such as keys, as noted above.

A first compartment 110 of the pocket on the single-sided pouch 100 of this embodiment is formed with dimensions to accommodate carrying a large electronic device 114, such as a mobile phone or tablet computer. A second compartment 112 may be included, with dimensions to accommodate carrying identification or other personal items 116 such as for example toiletries. A reflective strip 105 is shown positioned on the outside surface of the front side 104 of the storage pouch 100.

Figure 9:
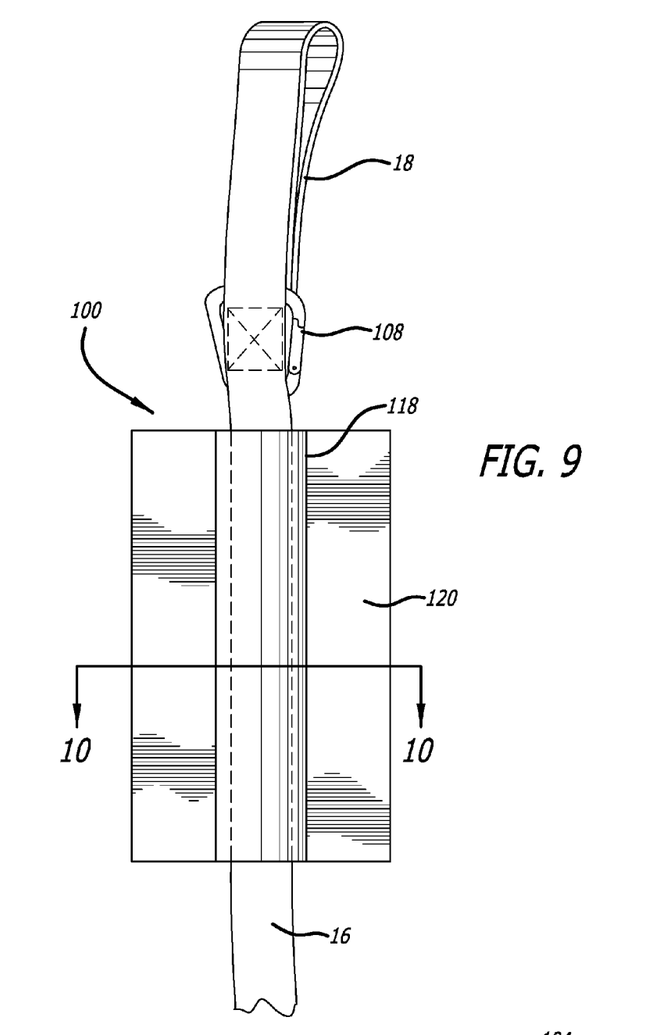
FIG. 9 is a back-side view of a storage pouch according to the embodiment of FIG. 7 and FIG. 8.
Figure 10:
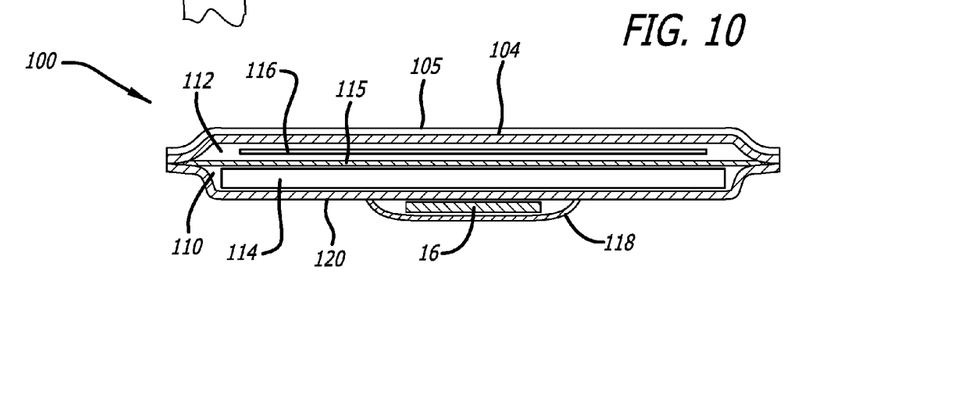
FIG. 10 is a cross-section along line 10-10 of FIG. 9 of a storage pouch according to the embodiment of FIGS. 7-9 with the internal compartments within the pocket exposed.

FIG. 9 shows the back side 120 of a storage pouch 100, with the user's existing leash 16 threaded through the channel 118. The channel 118 may be a mesh, fabric or webbed portion affixed to the back side 120, as indicated in FIG. 10, on the outer surface of a pocket on the back side 120. In FIG. 9, the leash handle 18 is attached to the storage pouch 100 with a carabiner 108 or other attaching device. The channel 118, regardless of the embodiment discussed herein, is contemplated to be wide enough to accommodate various and different-sized leashes 16.

FIG. 10 shows a cross-sectional view along line 10-10 of FIG. 9 of storage pouch 100, with a leash 16 threaded through the channel 118 on the back side 120 of the storage pouch 100 and opposite the front side 104. Reflective strip 105 is also shown on the front side 104. A first compartment 110 of the storage pouch 100 has dimensions to accommodate an electronic device 114 such as a mobile phone device, and a second compartment 112 is included with dimensions for personal items 116, such as identification, toiletries or sundries. A divider 115 may also be included to provide a separate between first compartment 110 and second compartment 112. The cross-sectional line 9-9 is below flap 102, so that flap 102 is not seen in FIG. 10.

Figure 11:
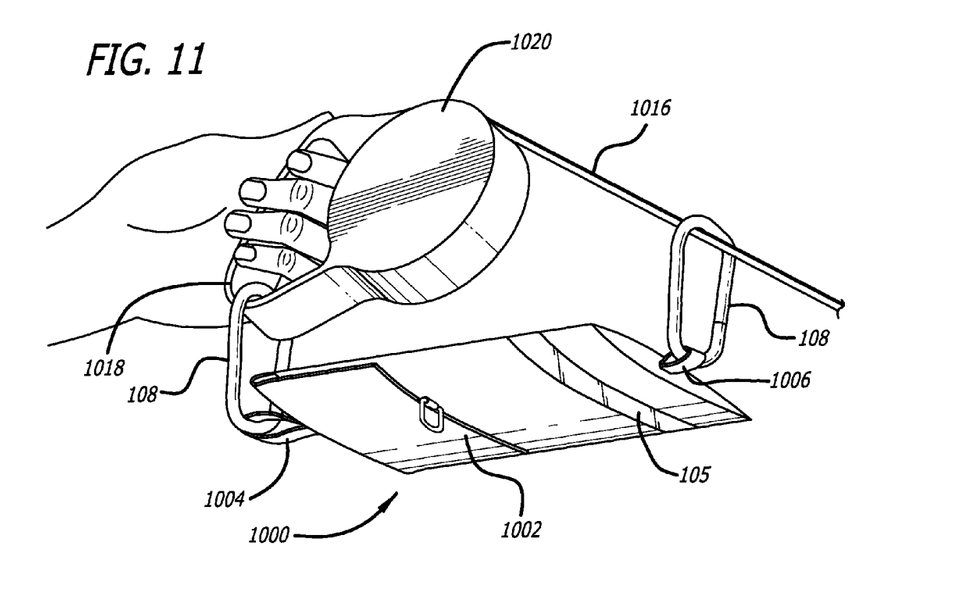
FIG. 11 is an upward-looking perspective view of a storage pouch according to another embodiment, coupled to a retractable leash with two carabiner attachments.
Figure 12:
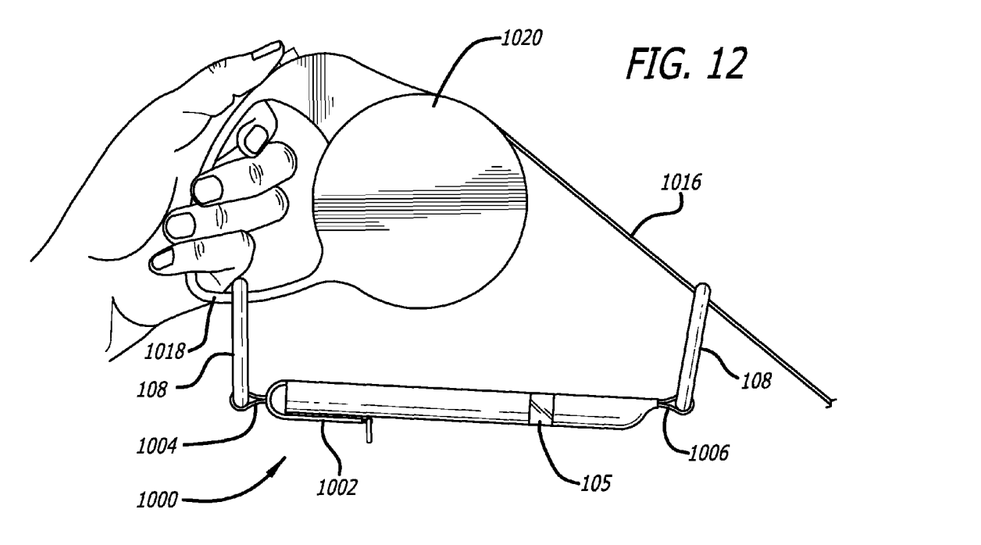
FIG. 12 is a side elevation view of the embodiment of FIG. 11.

FIG. 11 is an upward-looking perspective view of a storage pouch 1000, and FIG. 12 is a side elevation view of the embodiment of FIG. 11, according to another embodiment of the present invention. In this embodiment, the storage pouch 1000 is coupled to a retractable leash 1020 with two carabiners 108 that attach the storage pouch 1000 to the retractable leash 1020 at each end with a first loop attachment point 1004 at the top of the storage pouch 1000, and with a second loop attachment point 1006 at the bottom of the storage pouch 1000. The retractable leash 1020 has a leash lead 1016 that passes through one carabiner 108, and a handle 1018 that is coupled to the other carabiner 108. FIGS. 11 and 12 also show flap 1002 and reflective strip 105 of the storage pouch 1000.

Figure 13:
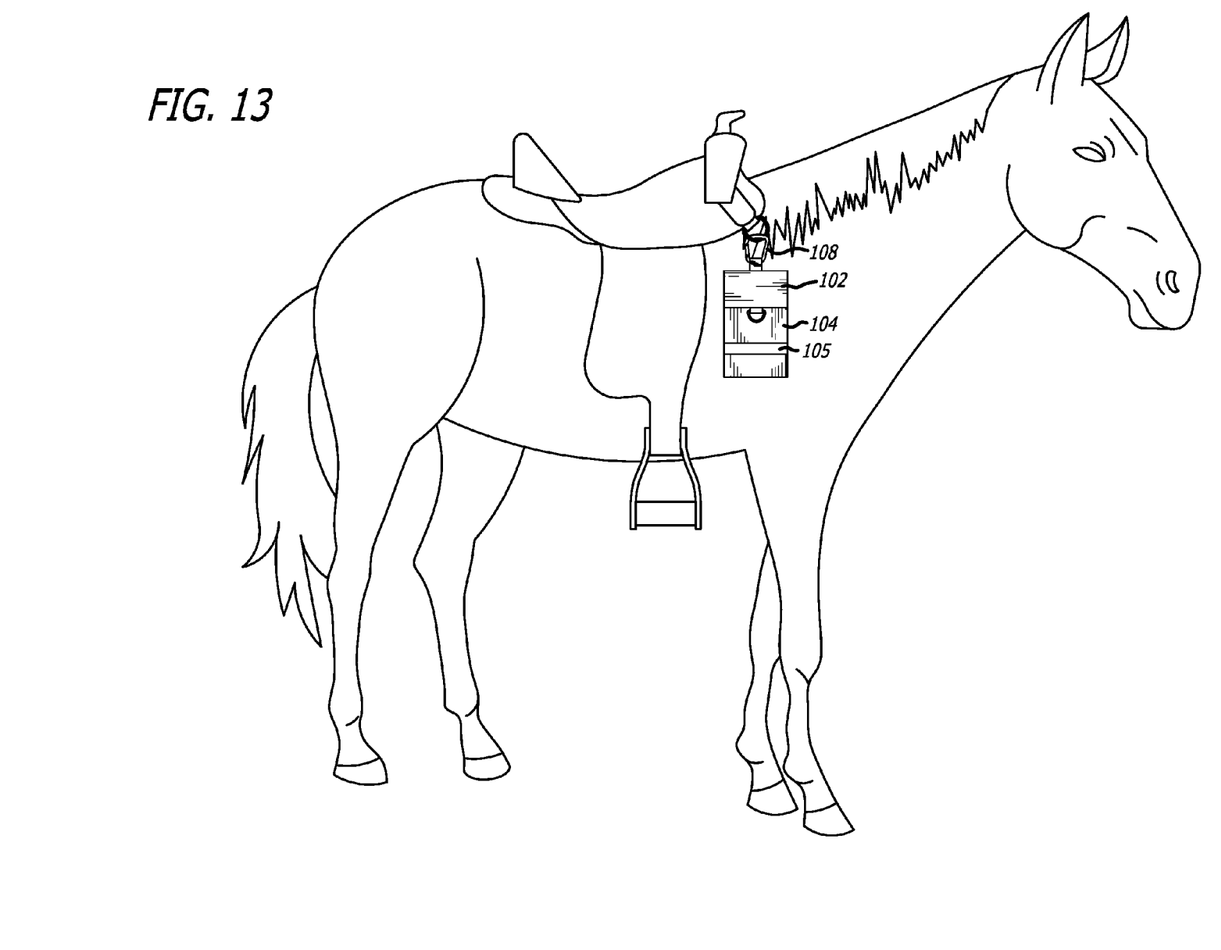
FIG. 13 is an overall view of a storage pouch according to one embodiment of the present invention.

FIG. 13 is an overall depiction of a storage pouch 10/100/1000 being used according to another embodiment of the present invention. In FIG. 13, the storage pouch 10/100/1000 is shown coupled to riding equipment, such as for example a saddle, in use upon a horse. The storage pouch of FIG. 13 includes a flap 102, shown in a closed configuration on a front side 104. A carabiner 108 is used to connect the storage pouch to one or more components of the riding equipment on the horse. The front side 104 also includes a reflective strip 105. The storage pouch of FIG.13 is also configured to carry within it one or more items such as a mobile telephone or other such device, or personal items 116.

Figure 14:
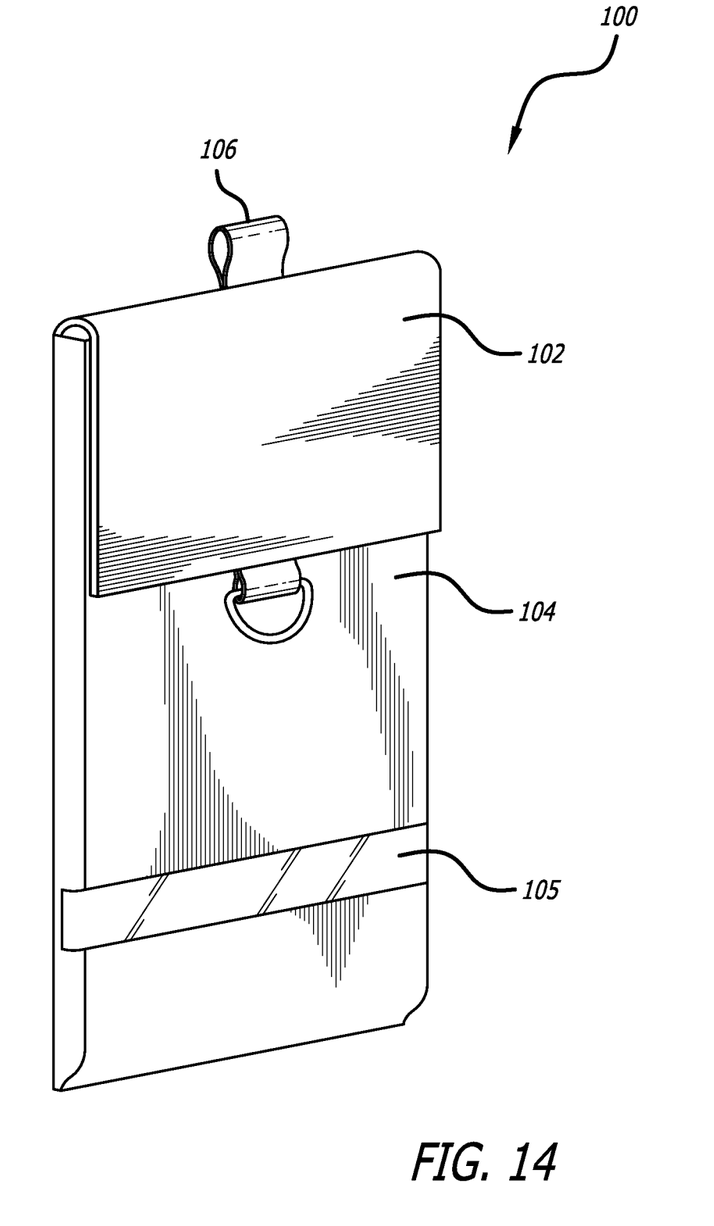
FIG. 14 is a perspective view of the storage pouch according to the embodiment of FIG. 13.
Figure 15:
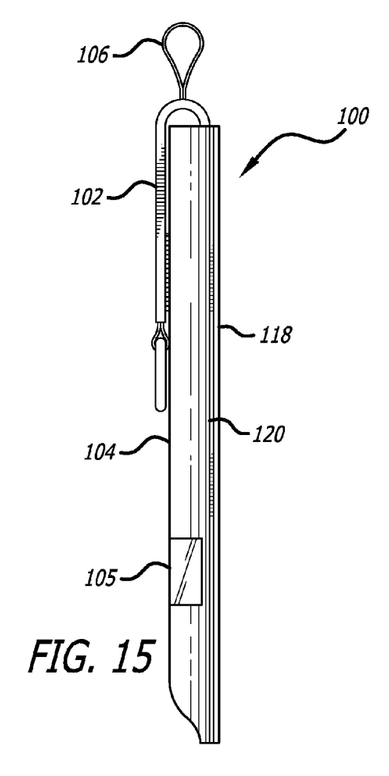
FIG. 15 is a first side view of the storage pouch according to the embodiment of FIG. 13.
Figure 16:
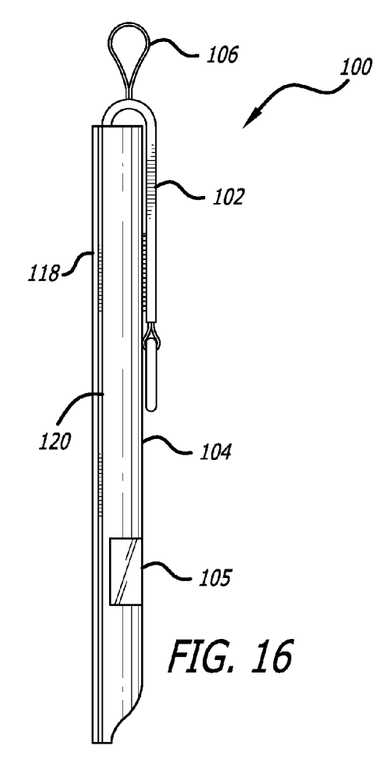
FIG. 16 is a second side view of the storage pouch according to the embodiment of FIG. 13.
Figure 17:
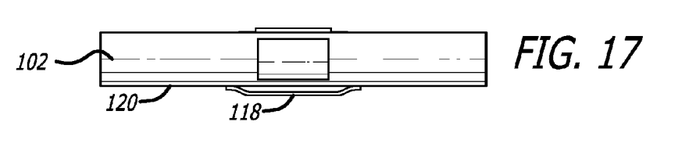
FIG. 17 is a top view of the storage pouch according to the embodiment of FIG. 13.
Figure 18:
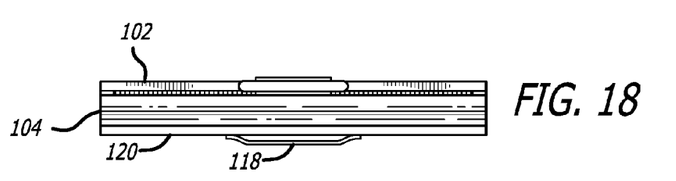
FIG. 18 is a bottom view of the storage pouch according to the embodiment of FIG. 13.

The storage pouch 10/100/1000 according to this embodiment may also include a channel, which provides an opening through which one or more components of the riding equipment may pass through to further secure the storage pouch thereto. FIGS. 14-18 are various views of the storage pouch as shown in FIG. 13. FIG. 14 is a first side view of the storage pouch, and FIG. 15 is a second side view thereof. FIG. 14 and FIG. 15 show a tab 106 and a channel 118 on the back side 120 of the storage pouch. FIG. 17 and FIG. 18 are top and bottom views, respectively, of the storage pouch according to the embodiment of FIG. 13. The top and bottom views also show the channel 118 on the back side 120 of the storage pouch 10/100/1000 according to this embodiment.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. For example, as noted above, multiple design configurations are contemplated, so that many different types of leashes (including but not limited to canvas, leather, rope, and retractable leases) can be accommodated. Further, channels for these leashes may further include an expansion portion which is open or closed by a zipper, snap(s), or other similar device or system, or may simply expand upon exertion of force, to accommodate different types of leashes with the same storage pouch. Channels in the present invention may therefore expand, and may additionally be comprised of material(s) enabling expansion, so that leashes and equipment of different sizes and shapes may be used with the same storage pouch. Additionally, pocket 28 in the embodiment of FIGS. 1-6, and the first and second compartments 110 and 112 of FIGS. 7-10, as well as the pocket(s) and compartments of FIGS. 11-12, may also be configured with such an expansion portion that can be open or closed as suggested above. Pockets 28, and first and second compartment 110 and 112, may further have any shape or size and come in different sizes and shapes depending on the storage of items therein. Pockets 28 and first and second compartments 110 and 112 may include internal pockets therein. These internal pockets may be specifically-shaped to hold specific devices, such as for example mobile phones or portable music players from particular manufacturers. The pockets 28 and first and second compartments 110 and 112 may themselves be specifically-shaped for devices or items from specific manufacturers. Similarly, the channel 22 and 118 may also have different shapes and sizes, and may be specifically-shaped for specific types or manufacturers of leashes 16. It is therefore intended that the scope of the invention be limited not by this detailed description.

Additionally, it is to be understood exercising a pet includes any physical activity with a pet, either indoors or outdoors. Such activity may include walking, running, or playing with a pet, and any other physical activity during which items may be securely stored within the present invention on a pet's leash instead of storage upon one's person.

Regardless of the embodiment in this description, it is to be further understood that the storage pouch of the present invention is configured to couple to the leash or riding equipment at or near a handle thereof (in the case of a leash) or near an easily reachable place relative to the rider (in the case of riding equipment). Such a configuration helps to couple the storage pouch to the leash or riding equipment so that the storage pouch remains positioned in substantially the same plane as the leash (or other equipment) relative to the pet or animal.

Also as noted above, the channel of the present invention provides an opening that allows the leash or other equipment to fully pass through the storage pouch, regardless of the embodiment or configuration. This enables interchangeability, so that the storage pouch can be removed from the leash or other equipment. Such a design allows the storage pouch to be used on other leashes or equipment, and also prevents damage to the leash or other equipment itself. It further enables a user to transfer the storage pouch, with or without its contents, to other places, such as for example to one's handbag or motor vehicle. Where the contents remain within the storage pouch, it enables a user to go from riding a horse to driving home without having to remove, and fumble with, items stored therein.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. An apparatus for use when exercising a pet, comprising:
   a plurality of pockets, including a first pocket on a front side of a storage pouch, and a second pocket on a back side of the storage pouch, each of the first and second pockets having a flap and a fastening means for closing the pocket and securely holding one or more items within the pocket while a pet is being exercised;
   a channel positioned between the front side and the back side, and configured to accept a leash of a pet so that at least a portion of the leash passes fully through the channel of the storage pouch, the channel having an open bottom end; and
   a fastening device positioned at an upper end of the channel for coupling the storage pouch to the leash and securing the at least a portion of the leash within the channel, the fastening device including a plurality of straps each having a first end and a second end, each first end coupled to an inside portion of the channel, and having at each second end a securing mechanism for coupling the storage pouch to the leash.

2. The apparatus of claim 1, further comprising a reflective strip on at least one of the front side and the back side of the storage pouch.

3. The apparatus of claim 1, further comprising a ring coupled to the flap on at least one of the first pocket and the second pocket for securing a set of keys to the storage pouch.

4. The apparatus of claim 1, wherein at least one pocket of the plurality of pockets has a dimension to accommodate storage of a mobile device inside the pocket, wherein the mobile device is at least one of a mobile telephone, a tablet computer, and a portable music player.

5. The apparatus of claim 1, wherein the storage pouch has dimensions of approximately 4" by 6.5".

* * * * *